United States Patent [19]

Glenn

[11] Patent Number: 4,641,193
[45] Date of Patent: Feb. 3, 1987

[54] VIDEO DISPLAY APPARATUS AND METHOD

[75] Inventor: William E. Glenn, Ft. Lauderdale, Fla.

[73] Assignee: New York Institute of Technology, Old Westbury, N.Y.

[21] Appl. No.: 679,227

[22] Filed: Dec. 7, 1984

[51] Int. Cl.[4] .............................................. H04N 5/74
[52] U.S. Cl. ..................................... 358/233; 358/213; 358/62
[58] Field of Search ................. 358/213, 212, 62, 233, 358/234; 350/360, 361; 340/717, 718, 783; 357/21 LR

[56] References Cited

U.S. PATENT DOCUMENTS

| | | | |
|---|---|---|---|
| 3,084,590 | 4/1963 | Glenn, Jr. | 350/361 |
| 3,882,271 | 5/1975 | Glenn | 358/223 |
| 4,392,158 | 7/1983 | Aoki et al. | 358/213 |
| 4,441,791 | 4/1984 | Hornbeck | 350/360 |
| 4,507,684 | 3/1985 | Battson | 358/213 |
| 4,544,765 | 4/1985 | Miyata et al. | 358/212 X |
| 4,558,365 | 12/1985 | Ochi | 358/212 |

OTHER PUBLICATIONS

"128×128 Deformable Mirror Device", L. Nornbeck; IEEE Transaction on Electron Devices; vol. ED-30, #5, May '83, pp. 539-545.

Primary Examiner—Howard W. Britton
Assistant Examiner—Victor R. Kostak
Attorney, Agent, or Firm—Martin M. Novack

[57] ABSTRACT

A solid state light modulator apparatus and method for displaying images represented by video signals. The system includes an array of semiconductor devices having electrodes arranged in a diagonal pattern, the devices being used, in conjunction with related circuitry, for applying sampled video signals to the electrodes. The resulting charge pattern deforms a reflective layer, and the deformations are converted to a viewable image by an optical system. In a preferred embodiment, every other line of a frame is grounded for one field, thereby achieving an improvement in the dynamic resolution of the display.

15 Claims, 12 Drawing Figures

VIDEO DISPLAY APPARATUS AND METHOD

BACKGROUND OF THE INVENTION

This invention relates to video display systems and, more particularly, to improvements in the type of video display which employs a deformable layer having deformations that depend upon a stored charge pattern and an optical subsystem for converting the deformations into a viewable image. The subject matter of this application is related to subject matter set forth in copending U.S. patent application Ser. Nos. 679,228 and 679,290, both filed of even date herewith and assigned to the same assignee as the present application.

There have been previously set forth techniques for displaying video information by storing a charge pattern representative of a video frame in a frame store and utilizing the charge pattern to modify a characteristic of a material. The modified characteristic of the material is then used to obtain a viewable image. For example, in U.S. Pat. No. 3,882,271, there is disclosed a system called a solid state light modulator wherein a charge pattern on a special array of semiconductor devices is used to obtain deformations of a conductive reflective layer disposed over the array and spaced therefrom by an elastomer material such as silicone gel. An optical subsystem, such as a Schleiren optical system, can then be utilized to convert the pattern of deformations (or "ripples") in the reflective layer into a viewable image.

There is a unique combination of problems associated with the structure of the semiconductor devices of the described type of solid state light modulator system. A substantial range of voltages must be applied to the individual device electrodes in order to achieve a substantial range of deflection forces on the reflective layer that is separated from these electrodes by a deformable material. For dynamic images, such as in television presentations, the video signals need to be read into the individual deflection electrodes at a fairly high rate. For the device to have good temporal responsiveness, the video-representative signals must be read into the electrodes of the individual semiconductor devices and maintained for a desired period of time at appropriate spacings and amplitudes, all within the constraints of a practical array having a large number of small elements which can be manufactured in quantity at a reasonable cost.

It is among the objects of the present invention to provide a semiconductor array and system which is responsive to this combination of needs, and which exhibits improved overall performance.

SUMMARY OF THE INVENTION

The present invention is directed to an improved apparatus and method for displaying images represented by video signals. In accordance with an embodiment of an apparatus of the invention, a semiconductor substrate is provided, and has an array of columns and rows of devices formed therein. The devices each comprise first and second spaced doped regions, an insulator layer disposed over the region between said doped regions, a gate electrode disposed over the insulating region, and a conductive deflection electrode coupled to the second doped region. A plurality of column input conductors are provided, each column input conductor being coupled to the first doped regions of the devices of at least one column. A plurality of row gate input conductors are provided, each row gate input conductor being coupled to the gates of the devices of at least one row. Means are provided for reading a line of video signal into elements of a video line store. Means are also provided for applying the signals from the elements of the line store to respective ones of the column input conductors. Means are provided for successively applying enabling signals to the row gate input conductors. A conductive/reflective (i.e., conductive and reflective) layer is spaced from the deflection electrode, and a layer of deformable material is disposed between the deflection electrodes and the conductive/reflective layer. Optical means are provided for converting deformations of the conductive layer into an image.

In an embodiment of the apparatus of the invention, each of the conductive deflection electrodes has a top flat region which extends over its associated device and is spaced therefrom by an insulating material. In this embodiment, the semiconductor substrate is n-type silicon and the doped regions therein are p-type silicon. Also, in this embodiment, the gate electrodes and the row conductors are formed of polysilicon material. The deflection electrodes of the array are arranged in a diagonal pattern with the deflection electrodes of each row of the array being offset horizontally with respect to the deflection electrodes of its adjacent rows of the array. It is generally known that diagonal sampling can be used to improve horizontal and vertical resolution. In embodiments hereof, a diagonal pattern of electrodes is used to advantage, in conjunction with diagonally configured Schleirin bars in the optical system.

In accordance with an embodiment of the method of the invention, a technique is provided for displaying images using a display apparatus of the general type set forth. An embodiment of the method includes applying, during one field of a video frame, a reference potential to even rows of devices and the input video signal to odd rows of devices; and applying, during the other field of a video frame, a reference potential to odd rows of devices and the input video signal to even rows of devices. By applying this reference potential (e.g. ground reference potential) to every other row of devices, and having each field of video information persist for one field duration (rather than one frame duration) on the solid state light modulator, a distinct advantage in dynamic resolution is achieved for moving objects of low spatial resolution.

In one form of the method of the invention, the applying steps include: reading, during the lines of one field of a video frame, alternating samples of input video signal and reference potential into a register in one order, and applying the samples from the register alternately into two successive rows of devices; and reading, during the lines of the other field of a video frame, alternating samples of input video signal and reference potential into a register in opposite order, and applying the samples from the register alternately into two successive rows of devices.

In another form of the method of the invention, the applying steps include: reading, during the lines of one field of a video frame, samples of input video signal into a first register and reference potential into a second registers, and applying the samples from the register respectively into two successive rows of devices; and reading, during the lines of the other field of a video frame, reference potential into the first register and samples of video signal into the second register, and applying the samples from the registers respectively into two successive rows of devices.

In both of these forms of the invention, the available transfer time of a new signal into a given semiconductor device is substantially an entire scanline time, by virtue of using extra registers in each case.

In accordance with still another form of the disclosed method, there is provided a technique whereby greatly reduced signal voltages can be used to obtain the necessary elemental deflections of the conductive/reflective layer. In this form of the method, a bias potential, preferably a negative potential, is applied to the conductive/reflective layer. During one field of a video frame, the input video signal is applied to the electrodes of even rows of devices, and a reference potential (e.g. ground) is applied to the electrodes of odd rows of devices, the reference potential being different than the bias potential. During the other field of a video frame, the input video signal is applied to the electrodes of odd rows of devices, and the reference potential is applied to the electrodes of even rows of devices. The method also has application in embodiments where isolation conductors are disposed between the electrodes of the devices, and the reference potential is applied to the isolation conductors.

Further features and advantages of the invention will become more readily apparent from the following detailed description when taken in conjunction with the accompanying drawings.

DESCRIPTION OF THE PREFERRED EMBODIMENT

Figure 1:
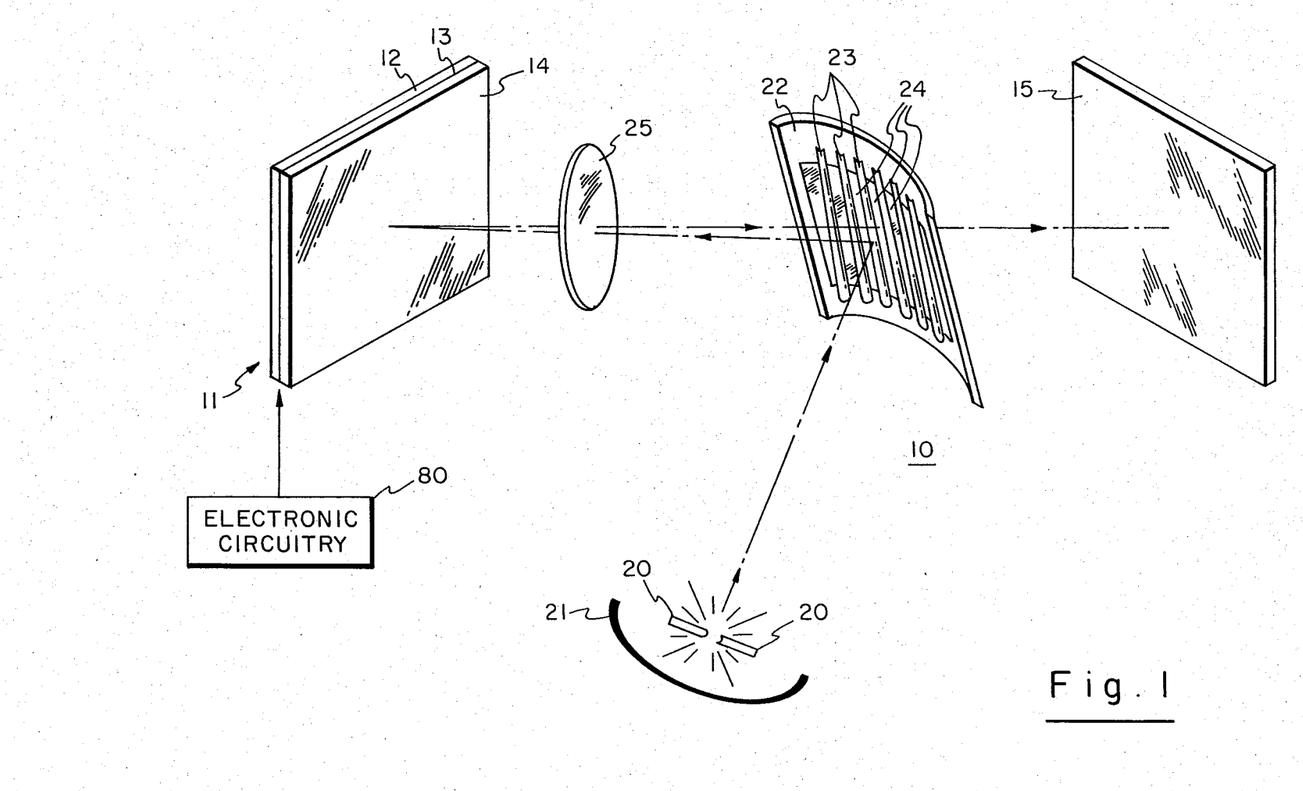
FIG. 1 is a simplified diagram of a type of prior art apparatus for displaying images, in which the improvements of the invention can be made.

Referring to FIG. 1, there is shown a simplified schematic diagram of the type of apparatus 10 in which the improvements of the invention are made. A semiconductor substrate 11 has an array of devices formed in a surface 12 thereof, these devices serving as semiconductor controlled storage units. A layer of deformable material 13 (which may be, for example, an elastomer such as silicone gel) covers the surface 12, and a reflective layer 14 of conductive material is disposed over the deformable layer 13. The semiconductor device array, and associated circuitry 80, both to be described in detail hereinbelow, receives and samples a video signal, the samples ultimately being stored as a charge pattern on the surface 12 of semiconductor 11. The electric field associated with the charge pattern results in a force with respect to the layer 14 which deforms the deformable material 13 and layer 14 so that information is contained in the reflective layer 14 in the form of depressions or ripples which are similar to a phase diffraction grating. This information is then displayed on a screen 15, such as by using a Schlieren type of optical system.

The optical system depicted in FIG. 1 is generally of the type disclosed in U.S. Pat. Nos. 3,084,590 and 3,882,271. In this system arc electrodes 20 generate an intense light source that is directed by a curved mirror 21 over a masking system 22 which includes a plurality of reflecting bars 23 separated by transparent areas or slits 24. The masking system 22 is positioned so that the light reflected from the bars 23 is transmitted toward a lens 25 where it is focused into parallel rays. These rays are incident on the deformed reflective surface 14 and are reflected back through the lens 25 toward the masking system 22. If, at a given instant, there were no depressions on the surface 14 to divert the light rays, the rays effectively emanating from each bar 23 would be focused by lens 25 on the same bar and no light would be incident on the screen 15. However, if there are depressions in the surface 14 they will act as diffraction gratings and some light will be diffracted and ultimately pass through the slits 24. The portion of a light rays transmitted through a particular slit depends on the amplitude of the infinitesimal diffraction grating from which the ray was diffracted. Thus, an appropriate pattern of diffraction gratings, resulting from a selected charge pattern, will yield a desired image on the screen 15. The charge pattern is stored by the array of semiconductor devices, to be described, in the semiconductor substrate 11. In embodiments hereof, the array of semiconductor devices is arranged in a diagonal pattern, and the Schleiren bars are also oriented diagonally.

Reference to prior art light modulator systems can be made to the abovereferenced U.S. Pat. No. 3,882,271 which is a forerunner hereof, and also to U.S. Pat. No. 4,441,791, which is of a different type in that it discloses a deformable mirror mounted on a grid over an array of semiconductor devices to form air-gap capacitors. Deformations of the mirror surface can be converted into an image by an optical system.

Figure 2:
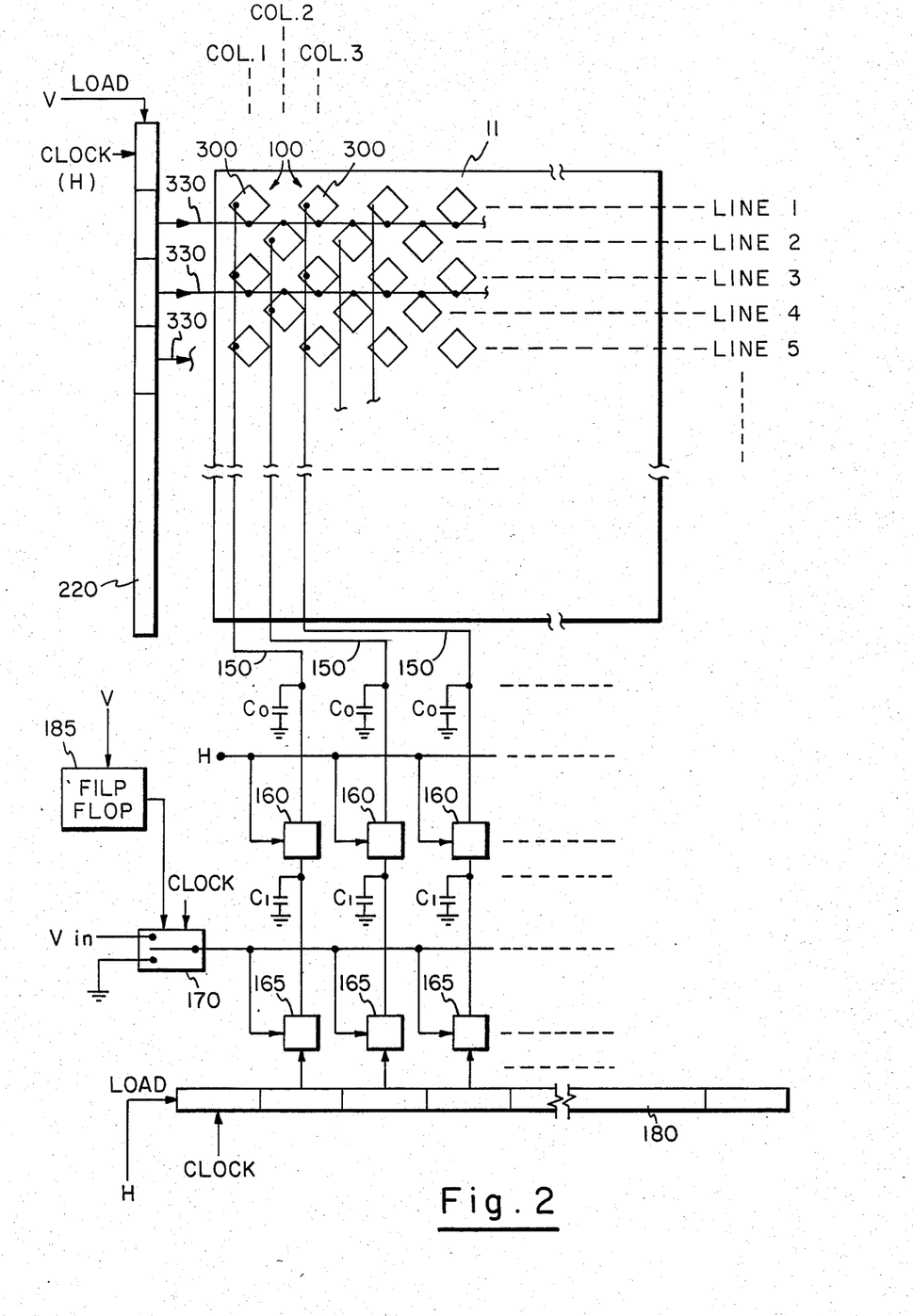
FIG. 2 is a block diagram, partially in schematic form, of a portion of an apparatus in accordance with an embodiment of the invention, and which can be used to practice the method of the invention.

Referring to FIG. 2, there is shown an array of devices in semiconductor substrate 11. In the diagram of FIG. 2, each device or element 100 is illustrated by its below), and stray capacitance. In copending U.S. patent application Ser. No. 557,941, assigned to the same assignee as the present application, there is disclosed a technique wherein the impedance in each column conductor between the input capacitor and its associated deflection electrodes is caused to vary in accordance with the change in video signal level from frame to frame, so as to achieve video noise reduction.

Figure 3:
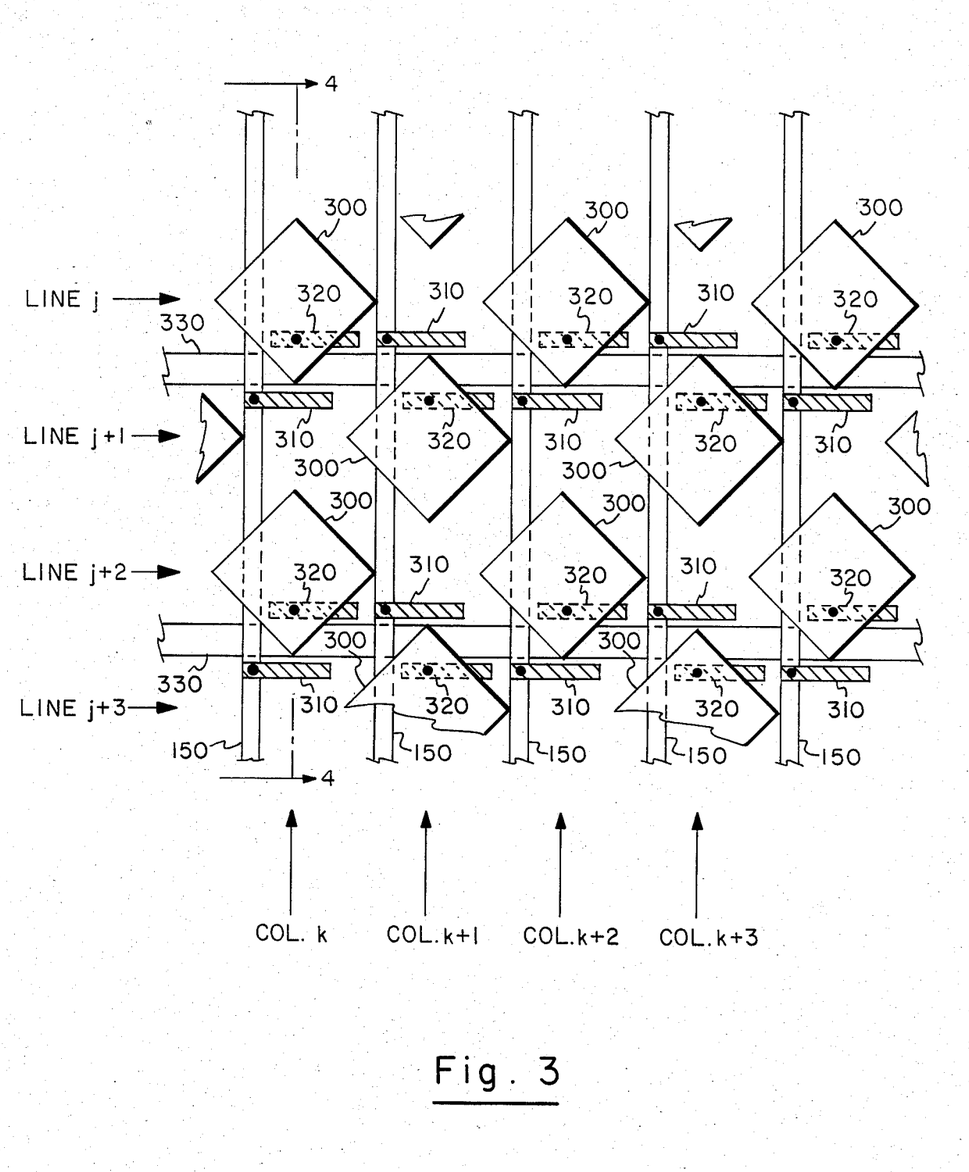
FIG. 3 shows further detail of the semiconductor devices of the FIG. 2 embodiment.
Figure 4:
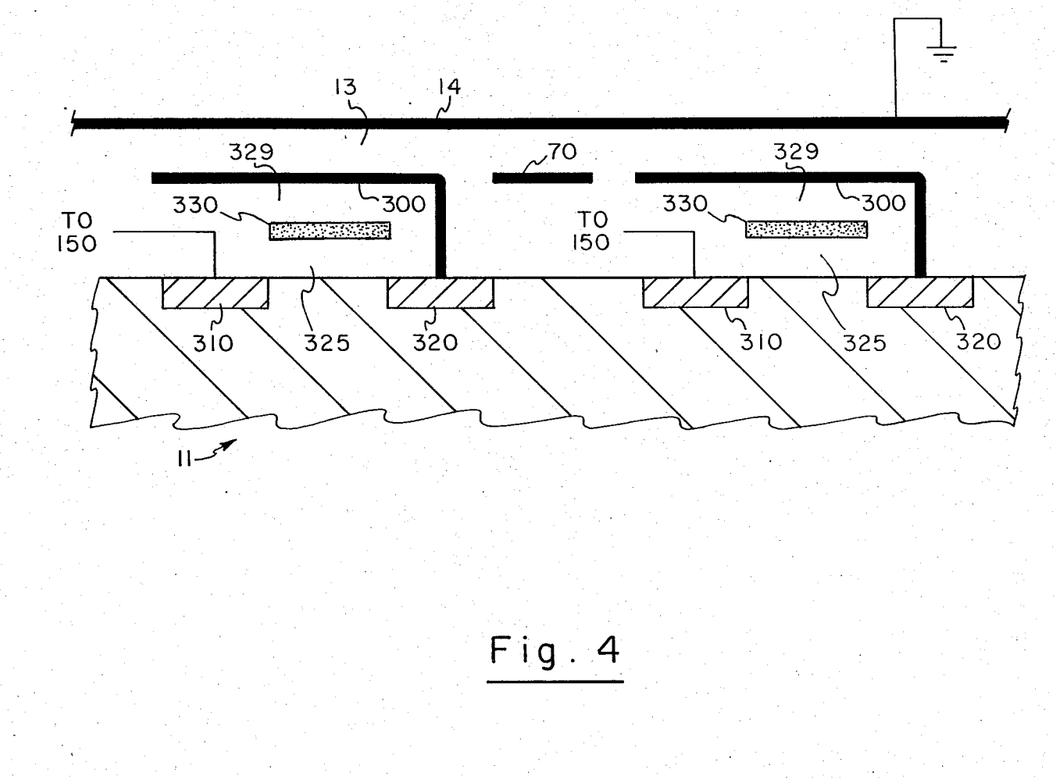
FIG. 4 shows a cross sectional view of semiconductor devices of the FIG. 3 embodiment, as taken through the section defined by arrows 4—4 in FIG. 3.

FIGS. 3 and 4 illustrate the configuration, in the present embodiment, of the devices 100 formed in the semiconductor substrate. The substrate is n-type silicon, and the regions 310 and 320 are spaced p-type diffusions, for example boron diffusions. The regions 310 are coupled to associated column conductors 150. The regions 320 are coupled to the respective deflection electrodes 300. An insulating region 325, typically a silicon dioxide layer, covers the semiconductor region between diffusions 310 and 320. The respective row conductors 330 are disposed above oxide layers 325, of the devices of their associated rows and serve as gates which, when energized or enabled, cause p-channel conduction between the regions 310 and 320 so that the signals on the column conductor lines are effectively coupled to the deflection electrodes 300 of the devices on the enabled rows. The deflection electrodes 300 have top flat regions which extend over their associated devices and are spaced therefrom by insulating material such as silicon dioxide 329. The row switching, at the line rate of operation, permits advantageous use of polysilicon, while the faster column switching employs metal conductors in the present embodiments. The polysilicon rows interfere less with adjacent or crossing components than would equivalent metal conductors. The p-channel devices avoid problems of avalanche breakdown which could occur with n-channel operation if relatively high operating voltages were employed. Also, the spacing between regions 310 and 320 is selected to avoid so-called punch through breakdown from occurring when the device is supposed to be turned off.

Figure 5:
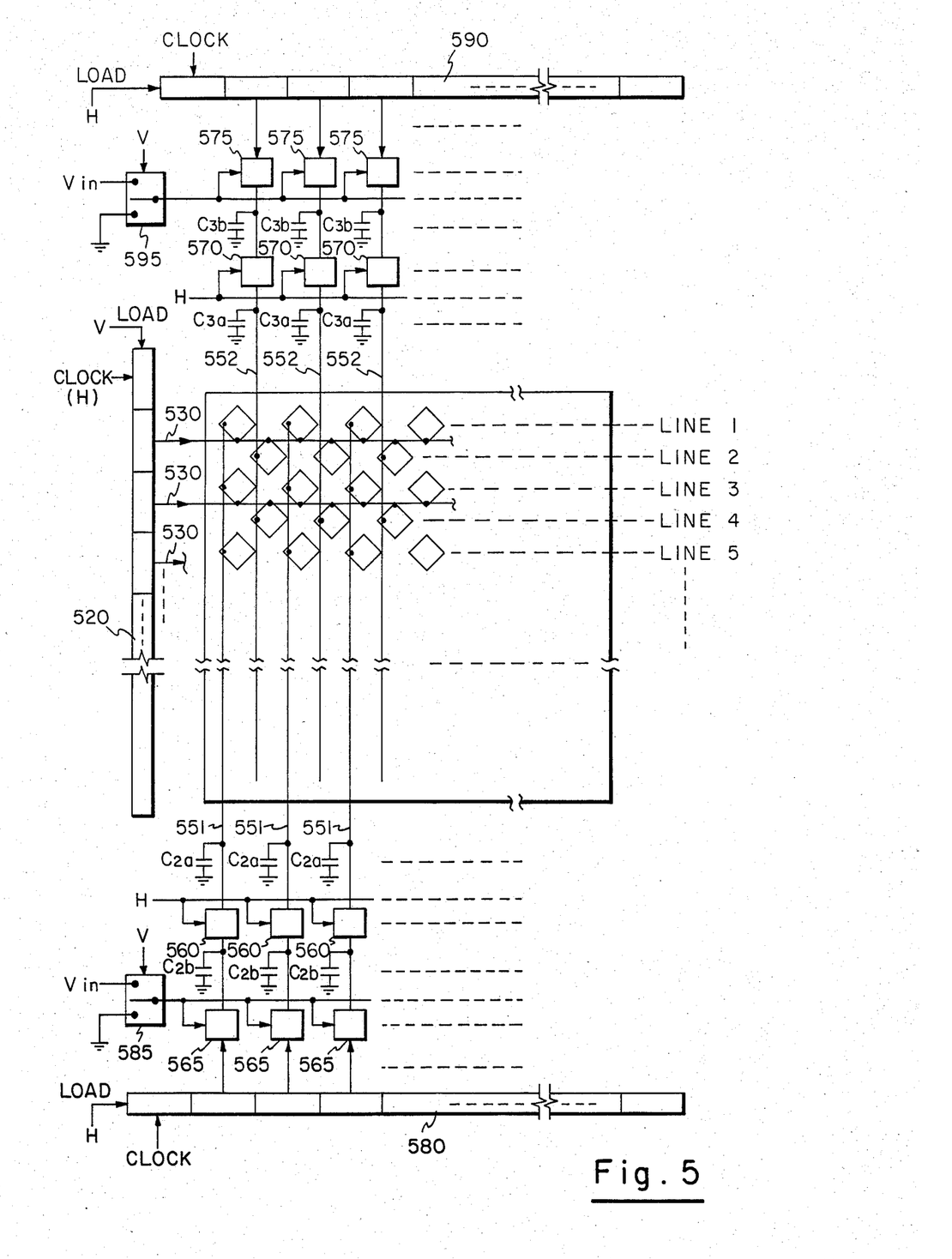
FIG. 5 is a block diagram, partially in schematic form, of a portion of an apparatus in accordance with another embodiment of the invention, and which can be used to practice another form of the method of the invention.

The embodiment of FIGS. 2-4 illustrates one way of having a means for entering a reference potential such as ground reference potential in alternating fields of elements; thereby, inter alia, enhancing the dynamic resolution of the display. In the embodiment of FIGS. 2-4, it is seen that the system clock rate used to clock the sampled video signal into the storage capacitors (and ultimately into the array) is twice the rate at which video information is being entered. [This is because half the time is being used to clock ground reference potential into every other horizontal element of a line, as described above.] In the embodiment of FIGS. 5 and 6, a clock rate can be used which is the same as the rate at which information is entered into the array; i.e., half the clock rate of the previous embodiments, for the same size array. As seen in FIG. 5, the device display electrodes are in the same general configuration as in FIG. 2. The row conductors 530 are coupled to the outputs of a shift register 520, and operate like their counterparts in FIG. 2 to sequentially enable row pairs of devices. The column conductors 551 of the odd columns are coupled to circuitry similar to that of FIG. 2; namely, to respective capacitors C2a, respective switches 560 that are again enabled by a signal derived from the horizontal sync signal H, respective capacitors C2b, and respective switches 565 which are enabled by respective outputs of shift register 580, which is clocked at the basic system clock rate and operates to successively enable the switches 565. The input to switches 565 is the output of a switch 585 which passes the input video signal during odd video fields and passes ground reference potential during even video fields.

The even column conductors 552 are coupled to similar circuitry which includes respective capacitors C3a, respective switches 570 that are enabled by a signal derived from the horizontal sync signal H, respective capacitors C3b, and respective switches 575 which, again, are sequentially enabled by respective output stages of a shift register (590) which is clocked at the basic system clock rate and operates to successively enable the switches 575. The input to switches 575 is the output of a switch 595 that is operative to pass the input video signal during even video fields and ground reference potential during odd video fields of a video frame. [As above, the groups of capacitors, such as C2a, C2b, C3a and C3b can be considered as storage registers which, in the present embodiment, are operative to store and transfer a line of sampled video signal (or ground reference potential, as the case may be)]. In the present embodiment, the clock rate used can be half of that which was employed in the FIG. 2 embodiment, since the odd and even subsystems are utilized simultaneously to read in and transfer sampled input video signals and ground reference potential (as the case may be) into respective odd and even rows of the array devices.

In operation of the embodiment of FIG. 5, during an odd video field the switch 585 is operative to pass the input video signal so that, for example, during the first video scanline the input video signal is sampled, under control of shift register 580, and stored in capacitors C2a. Simultaneously, switch 595 is passing ground reference potential, which is being read into capacitors C3a under control of shift register 590. At the end of the first scanline, the switches 560 and 570 are momentarily enabled to transfer the signals from capacitors C2a into respective capacitors C2b, and to transfer the signals from capacitors C3a into capacitors C3b. The first row conductor 530, which is coupled to the devices of lines 1 and 2 of the array (as in the previous embodiment) is also enabled (and remains enabled during the next scanline, during which the sampled video signals (or ground reference potential, as the case may be) in capacitors C2b and C3b are transferred into the respective display electrodes of lines 1 and 2 of the array. During the next video field, the odd and even line conductors (and their associated circuits) reverse roles (by virtue of switching the status of switches 585 and 595) and ground reference potential is transferred into line 1 while the sampled video signal is transferred into line 2. It will be understood that a separate switching arrangement, such as for directly switching ground reference potential to the appropriate activated row, could be used. This would be a more efficient way of applying the grounds, but would require additional switching circuitry.

Figure 6:
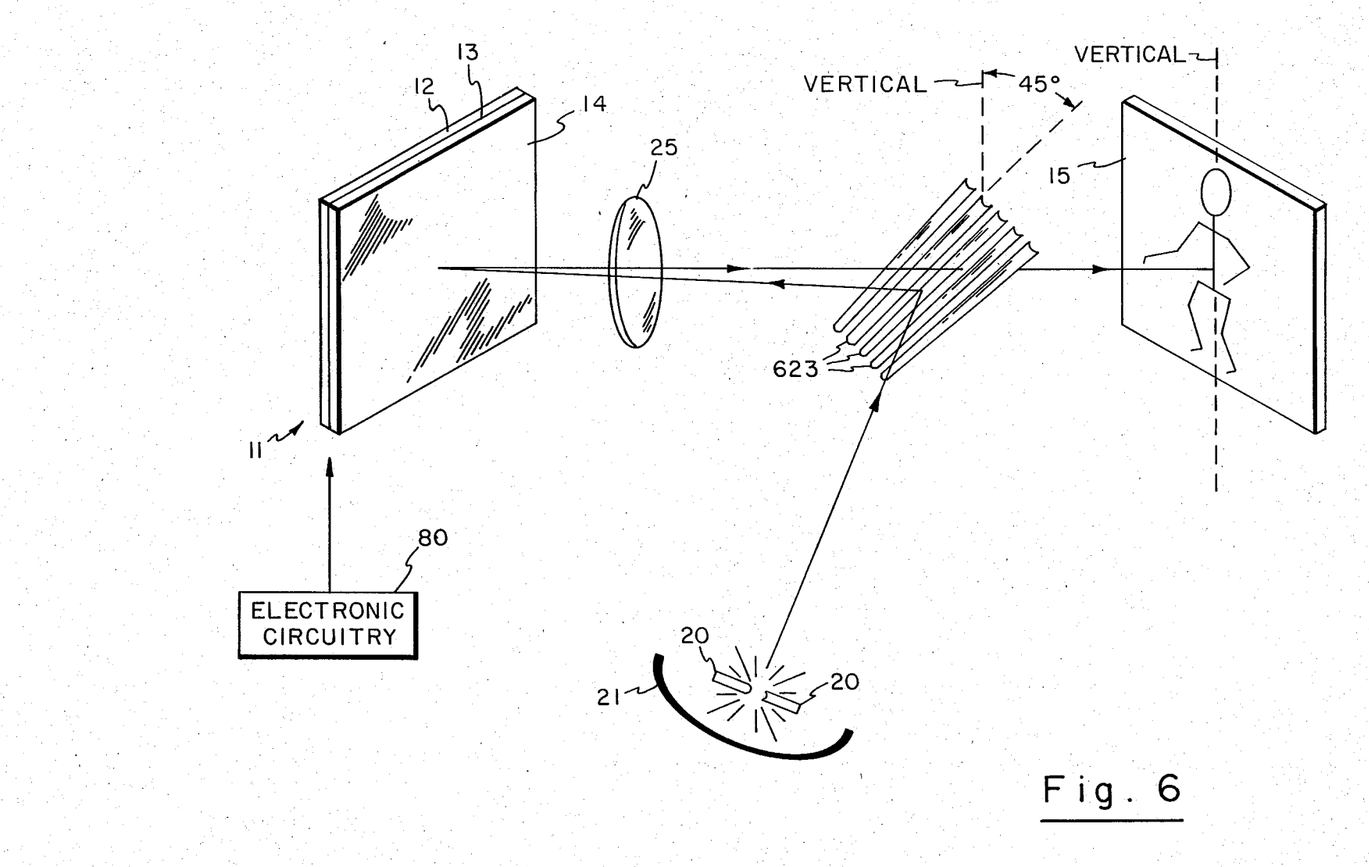
FIG. 6 shows an apparatus in accordance with an embodiment of the invention which utilizes a diagonal Schleiren optical system.
Figure 7:
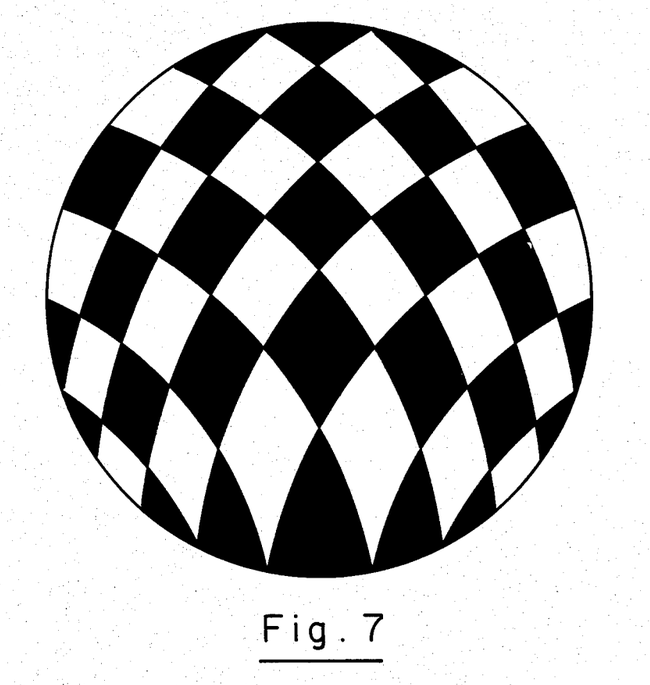
FIG. 7 shows a checkerboard pattern of Schleiren bars which can be used in an embodiment of the invention.

FIG. 6 illustrates a system like the FIG. 1 system, but utilizing an array and associated circuitry such as was described above, and diagonally oriented Schleiren bars 623. In the FIG. 6 illustration, the Schleiren bars are oriented at about 45 degrees with respect to the vertical axis of the image. The Schleiren bars can alternatively be in a checkerboard pattern, e.g. shown in FIG. 7 on a curved surface, or a combined vertical and diagonal pattern.

Figure 8:
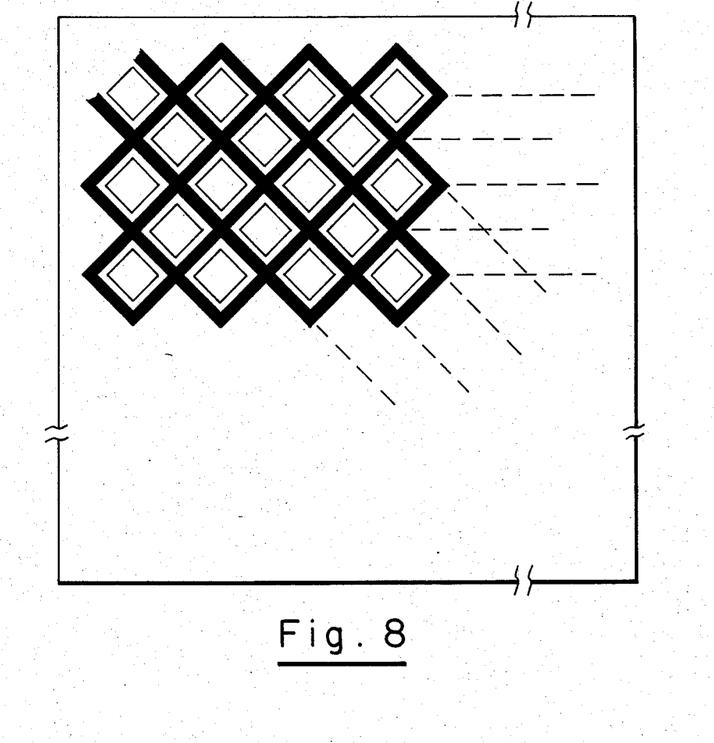
FIG. 8 shows an apparatus in accordance with an embodiment of the invention which utilizes a diagonal crossing pattern of isolating conductors.

In FIG. 8 there is shown a diagonal crossing pattern of grounded isolation conductors surrounding the dedeflection region 300, which is shown as being a square in the present embodiment, the squares being oriented and arranged in a diagonal pattern; i.e., with the deflection electrodes of each row of the array being offset horizontally with respect to its adjacent rows.

In the FIG. 2 embodiment, the lines of elements 100 are numbered at the right of the Figure as line 1, line 2, etc., and illustrative elements from a central exemplary portion of the array are shown in FIG. 3 which shows a small portion of four consecutive lines designated using the generalized terminology of line j, line j+1, line j+2, and line j+3. In FIG. 2, the columns of the array are numbered as column 1, column 2, column 3, etc., and in FIG. 3 the columns from a central examplary portion of the array, are designated as column k, column k+1, column k+2, and column k+3. Each element of a column of the array is coupled in common, in a manner to be described, to a common column conductor 150 for that line, as seen in FIGS. 2 and 3. As seen in FIG. 2, the respective column conductors are coupled to respective sides of capacitors Co, the other sides of which are coupled to ground reference potential. [These and other groups of capacitors can be considered as storage registers, and it will be understood that suitable analog registers (or digital registers in conjunction with conversion circuitry), such as charge coupled device registers, could alternatively be employed.] The column conductors and respective capacitors Co are also coupled, via respective switches 160, to respective sides of capacitors C1, the other sides of which are also coupled to ground reference potential. [Again, these capacitors can be considered as a storage register.] The switches 160 are simultaneously enabled by a signal derived from the horizontal sync signal, H. The capacitors C1 are also each coupled, via respective switches 165, to the output of another switch 170. The switches 165 are respectively enabled by signals on the output lines of respective stages of a shift register 180. The register 180 is loaded at one end (the right end in FIG. 2) with a logical "1" (high) level which is clocked through the register at a basic system element rate, from a clock, not shown. The switch 170 is operative, under control of the output of flip flop 185, and the clock signal, to couple either the video input signal or ground reference potential to the inputs of switches 165. The vertical synchronizing signal, V, is utilized to set a different initial state of the flip flop 185 for the beginning of each scanline of a given field. In this manner, the switch 170 is used to load a scanline of information into capacitors C1 (via switches 165), under control of register 180, with successive samples of input video information alternating with ground reference potential. Therefore, for example, if the sampled input video signal is designated Vs, and ground reference potential is designated gnd, the sequence which will be stored in the capacitors C1 for the first line of an odd video field would be Vs, gnd, Vs, gnd, Vs . . . . During the even video field, the sequence will start with opposite phase (i.e., with gnd instead of Vs), so the sample signals in the stored in capacitors C1 will be gnd, Vs, gnd, Vs, gnd . . .

The row conductors 330 are coupled to respective outputs of shift register 220, the outputs of register 220 being used to selectively enable the row conductors in sequence. The register 220 is clocked by the horizontal synchronizing signal, and is synchronized by the vertical synchronizing signal, V. At the beginning of each field, a signal derived from V is used to load the first stage of the shift register 220 with a logical "1" (high) level. At each horizontal scanline of the field, the logical "1" level is shifted to the next position in the register so that the row conductors are sequentially enabled, one line at a time.

In operation of the system of FIGS. 2 and 3, a scanline of sampled video information is read sequentially into the capacitors C1 in alternation with ground reference potential. At the end of the scanline, a signal derived from the horizontal sync signal H is used to enable switches 160, so that the sampled video information (and gnd, as the case may be) in the capacitors C1 is coupled to respective capacitors Co and the respective column conductors 150. This substantially stores the sampled elemental signals in capacitors Co where they are applied, during the next scanline (and while the next line of video information is being read into the respective capacitors C1), to the respective column conductors. The signal derived from H is also operative, at this time, to shift the register 220 so as to enable the next row conductor for the duration of the next line. It can be noted that the capacitors C1 and Co are charged (or discharged, as the case may be) through low impedances, so they can be charged in the relatively short durations during which their respective switches are enabled.

Each elemental signal can now be transferred into the respective deflection electrodes 300, in a manner to be described further hereinbelow, of the two successive lines whose common row conductor has been enabled by the output of the register 220. It will be recalled that every other signal level entered in capacitors Co was at ground reference potential. Therefore, the video signal samples for the given scanline will be transferred into the respective deflection electrodes of one of the lines associated with the enabled row conductor, and ground reference potential will be transferred into each of the deflection electrodes of the other line which shares the energized row conductor. Thus, for example, in FIG. 2, if the enabled row conductor is the one which is shared by lines 3 and 4, during an odd field the sampled video signals will be transferred into the respective deflection electrodes 300 of line 3, and ground reference potential will be transferred into the deflection electrodes 300 of line 4. As explained above, during the next field of video information (an even field), the capacitors C1 will be loaded with ground reference potential and the video signal in opposite order as compared to the previous field, so that ground reference potential will be transferred into the deflection electrodes 300 of line 3, and the sampled video signals will be transferred into the deflection electrodes 300 of line 4.

During the transfer from the input capacitors Co to the respective deflection electrodes of the lines associated with the enabled row conductor, which occurs during approximately one scanline period, the next scanline of video information is being read into the capacitors C1 (again, in alternation with ground reference potential). In this manner, substantially a full scanline duration is available for transfer of the signal from the capacitors Co into the capacitance associated with the respective deflection electrodes. In particular, this capacitance comprises the capacitor formed by each deflection electrode 300 and the common electrode 14 (e.g. FIGS. 1 and 3) disposed above the deformable material (which is shown at ground reference potential in the present embodiment, but which can be preferably operated at a negative bias voltage, as described hereinvices of the array. These conductors, which can be permanently grounded or at another reference potential, as described below, are illustrated in FIG. 4 by reference numeral 70.

Figure 10:
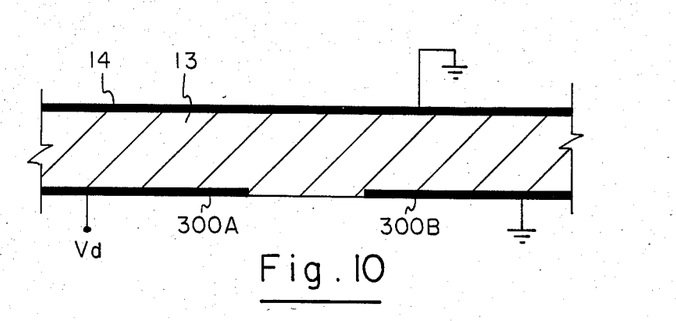
FIG. 10 is a simplified diagram illustrating deflection electrodes (or one electrode and one grounding conductor) and the conductive/reflective electrode of devices described in conjuction with prior Figures.

In the diagram of FIG. 10, there is shown a portion of the previously described devices; namely deflection electrodes 300A and 300B, deformable layer 13, and conductive/reflective layer 14. The feature of the invention to be described has application in configurations wherein there are isolation conductors, at a fixed reference potential, around each deflection electrode (e.g. FIG. 8) or where the adjacent electrodes reverse roles, during alternating fields, with regard to which one has a fixed reference potential applied (e.g. FIG. 5). Assume for the time being that 300B is fixed at ground reference potential (although it will be understood that it can switch roles with 300A during alternate video fields, as previously described). In FIG. 10, ground reference potential is also illustrated as being conventionally applied to the conductive/reflective layer 14. The input video signal applied to deflection electrode 300A is designated Vd. The force exerted on layer 14 is proportional to the square of the voltage between it and its opposing electrode. The degree of deflection of layer 14, at a given position can be expressed as the difference in force exerted by adjacent electrodes such as 300A and 300B. Accordingly, in FIG. 10 the deflection would be proportional to $Vd^2 - 0^2 = Vd^2$.

Figure 11:
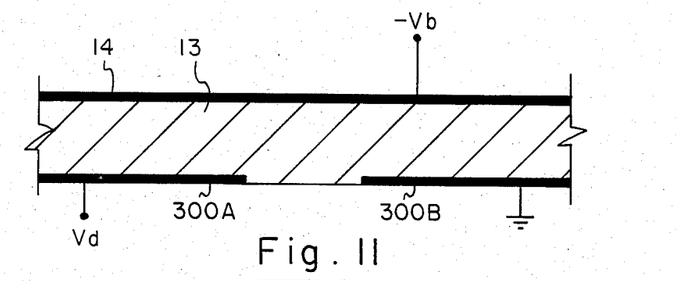
FIG. 11 is useful in illustrating a biasing arrangement of the FIG. 10 elements which results in improved performance.

In the arrangement of FIG. 11 an improvement in deflection sensitivity, as a function of the applied voltage, is obtained by applying a bias potential to layer 14 that is different than the reference potential applied to electrode 300B. In the present embodiment, the deformable layer 13 is an elastomer such as a silicone gel. There is some conduction of charges in the gel, and the positive and negative charges are not equally mobile. Accordingly, there will be residual charges in the gel, and these charges will be positive charges. It is therefore advantageous to operate with the conductive/reflective layer 14 at a negative potential, since, with this polarity, the field strength (and thus the force) will be greater at the layer 14, where the residual positive charges in the gel oppose the applied negative bias potential. In FIG. 11 the electrode 300B is at a reference potential which, in the present embodiment is ground reference potential. A bias potential $-Vb$ is applied to conductive/reflective layer 14, and the input video signal applied to electrode 300A is again designated Vd. The deflection in this case will therefore be proportional to $(Vd+Vb)^2 - Vb^2$, which is seen to be greater than in the FIG. 10 case. Negative bias voltages of $-50$ volts, or more negative, can be employed to advantage.

Applicant has noted that an additional phenomenon improves the device sensitivity. For higher bias fields there is a reduction in the effective restoring force, thereby improving sensitivity. If one calculates the energy in the field (which is $\frac{1}{2} CV^2$ at each electrode) it is seen that there is less energy when the conductive/reflective layer is rippled than when it is flat. For higher fields, the surface tries to get longer rather than shorter, which is like having a negative surface tension. This force opposes the normal restoring force and tends to improve the effective sensitivity. This has been verified experimentally. The following table illustrates the applied signal voltage Vd (measured) required for full deflection in one experimental device, for different negative bias voltages, $-Vb$. The righthand column shows the predicted signal voltage assuming a constant force required for full deflection (that force being the force resulting from 60 volts of applied voltage adjacent 0 volts, in this example), as computed from the above difference-of-force deflection relationship:

TABLE

| $-Vb$ | Vd (measured) | Vd (predicted) |
|---|---|---|
| 0 | 60 | 60 |
| 64 | 20 | 24 |
| 104 | 10 | 16 |

As the magnitude of the bias voltage is increased, it is seen that the predicted signal voltage necessary for full deflection is decreased (first and third columns of the table). From the second column, it is seen that at higher bias voltages the sensitivity is substantially better than predicted from the difference-of-force relationship, thereby confirming that there is a reduction in restoring force as the layer 14 ripples. If the bias voltage is made large enough, the sensitivity gets extremely high, but the surface will eventually "shrivel up", as the negative surface tension exceeds the restoring force.

Figure 12:
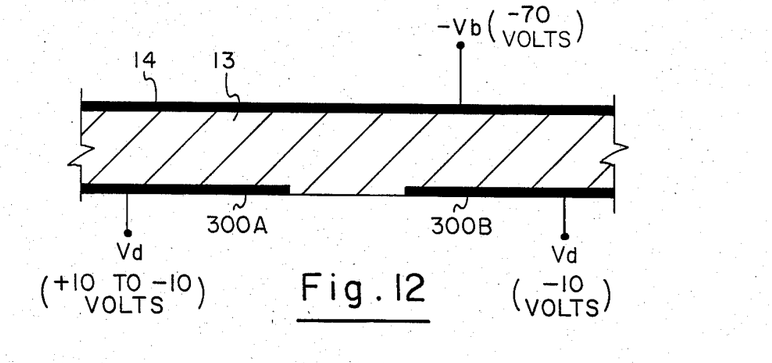
FIG. 12 is useful in illustrating another biasing arrangement of the FIG. 10 elements which results in improved peformance.

FIG. 12 shows another arrangement wherein a negative bias voltage $-Vb$ (for example $-70$ volts) is again applied to the layer 14, but a smaller negative reference voltage $-Vr$ (for example $-10$ volts) is applied to electrode 300B. In this case the applied video signal Vd is adjusted to be in a range covering negative to positive values (for example $-10$ volts to $+10$ volts). This may be done, for example, by subtracting 10 volts from a sampled input signal that was originally in the range 0 volts to $+20$ volts. This arrangement can again also be utilized, if desired, in the form hereof where the adjacent electrodes switch roles during alternating fields with regard to which one has a fixed reference potential applied. An advantage of the FIG. 12 arrangement is the reduction of the necessary voltage magnitude in the semiconductor chip; e.g. where the substrate is maintained at ground reference potential. In the example of FIG. 12 the voltage magnitude in the chip would be 10 volts (as compared to a 20 volt voltage magnitude within the chip for a signal voltage in the range 0 volts to $+20$ volts, with the substrate again at ground).

The arrays of semiconductor devices hereof can be fabricated, for example, utilizing known semiconductor lithographic processes. Appropriate masks for the patterns of diffusions, electrodes, contacts, polysilicon and conductive layers, etc., are designed and utilized in sequences of selective diffusions, layer deposition, selective etching, electrode deposition, etc. (in the requisite order, as known in the art). The deformable layer 13 and conductive and reflective layer or layers 14 can be applied using techniques set forth, for example, in copending U.S. patent application Ser. Nos. 574,928 and 574,929 assigned to the same assignee as the present application.

Figure 9:
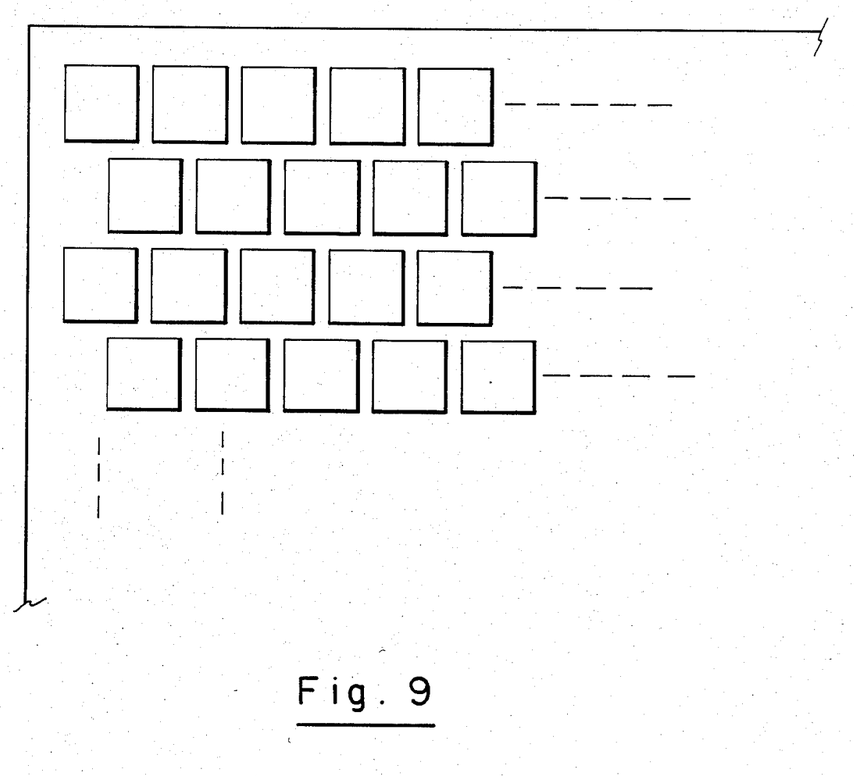
FIG. 9 illustrates alternative orientation and arrangement of the deflection electrodes.

The invention has been described with reference to particular preferred embodiments, but variations within the spirit and scope of the invention will occur to those skilled in the art. For example, a diagonal pattern of deflection electrodes can have alternative configurations and/or arrangements, such as is illustrated in FIG. 9.

I claim:

1. Apparatus for receiving frames of video signals and displaying images represented by said video signals, comprising:

a semiconductor substrate, having an array of columns and rows of devices formed therein, said devices comprising: first and second spaced doped regions; an insulator layer disposed over the region between said doped regions; a gate electrode disposed over said insulating region; and a conductive deflection electrode coupled to said second doped region;

a plurality of column input conductors, each said column input conductor being coupled to the first doped region of the devices of at least one column;

a plurality of row gate input conductors, each said row gate input conductor being coupled to the gates of the devices of at least one row;

a video line store;

means for reading a line of video signals into elements of said line store;

means for applying the signals from elements of said line store to respective ones of said column input conductors;

means for successively applying enabling signals to said row gate input conductors;

means for applying a reference potential to the even rows of devices of said array during one field of a video frame, and for applying said reference potential to the odd rows of devices of said array during the other field of a video frame;

a conductive/reflective layer spaced from said deflection electrodes;

a layer of deformable material disposed between said deflection electrodes and said conductive/reflective layer; and optical means for converting deformations of said conductive layer into an image.

2. Apparatus as defined by claim 1, wherein each of said conductive deflection electrodes has a top flat region which extends over its associated device and is spaced therefrom by an insulating material.

3. Apparatus as defined by claim 1, wherein the deflection electrodes of said array are arranged in a diagonal pattern with the deflection electrodes of each row of the array being offset horizontally with respect to the deflection electrodes of its adjacent rows of the array.

4. Apparatus as defined by claim 2, wherein the deflection electrodes of said array are arranged in a diagonal pattern with the deflection electrodes of each row of the array being offset horizontally with respect to the deflection electrodes of its adjacent rows of the array.

5. Apparatus as defined by claim 3, further comprising a diagonally oriented crossing pattern of grounding conductors disposed on said array of devices to provide isolation of said devices.

6. Apparatus as defined by claim 4, further comprising a diagonally oriented crossing pattern of grounding conductors disposed on said array of devices to provide isolation of said devices.

7. Apparatus as defined by claim 3, wherein said optical means includes diagonally configured Schleirin bars.

8. Apparatus as defined by claim 4, wherein said optical means includes diagonally configured Schleirin bars.

9. Apparatus as defined by claim 5, wherein said optical means includes diagonally configured Schleirin bars.

10. Apparatus as defined by claim 6, wherein said optical means includes diagonally configured Schleirin bars.

11. In a video display apparatus for displaying images represented by frames of input video signal, that includes: an array of columns and rows of devices in a semiconductor substrate, each of said devices having a conductive deflection electrode, means for applying electrical signals to said devices, a conductive/reflective layer spaced from the deflection electrodes and being deformable by electrical potentials between the deflection electrodes and the conductive layer, and optical means for converting deformations of the conductive layer into an image; the improvement comprising:

means for applying, during one field of a video frame, a reference potential to even rows of devices and the input video signal to odd rows of devices; and means for applying, during the other field of a video frame, reference potential to odd rows of devices and the input video signal to even rows of devices.

12. For use in conjunction with a video display apparatus that includes: an array of columns and rows of devices in a semiconductor substrate, each of said devices having a conductive deflection electrode, means for applying electrical signals to said devices, a conductive layer spaced from the deflection electrodes and being deformable by electrical potentials between the deflection electrodes and the conductive layer, and optical means for converting deformations of the conductive layer into an image; a method for displaying images represented by frames of input video signal, comprising the steps of:

applying, during one field of a video frame, a reference potential to even rows of devices and the input video signal to odd rows of devices; and applying, during the other field of a video frame, reference potential to odd rows of devices and the input video signal to even rows of devices.

13. The method as defined by claim 12, wherein said applying steps include:

reading, during the lines of one field of a video frame, alternating samples of input video signal and reference potential into a register in one order, and applying the samples from said register alternately into two successive rows of devices; and reading, during the lines of the other field of a video frame, alternating samples of input video signal and reference potential into a register in opposite order, and applying the samples from said register alternately into two successive rows of devices.

14. The method as defined by claim 13, wherein said applying steps include:

reading, during the lines of one field of a video frame, samples of input video signal into a first register and reference potential into a second register, and applying the samples from said registers respectively into two successive rows of devices; and reading, during the lines of the other field of a video frame, reference potential into the first register and samples of video signal into the second register, and applying the samples from said registers respectively into two successive rows of devices.

15. Apparatus for receiving frames of input video signals and displaying images represented by said video signals, comprising:

a semiconductor substrate, having an array of columns and rows of devices formed therein, said devices having respective conductive deflection electrodes arranged in a diagonal pattern with the deflection electrodes of each rows of the array being offset horizontally with respect to the deflection electrodes of its adjacent rows of the array;

a conductive layer spaced from said deflection electrodes;

a layer of deformable material disposed between said deflection electrodes and said conductive layer;

optical means for converting deformations of said conductive layer into an image;

means for applying, during one field of a video frame, a reference potential to even rows of devices and the input video signal to odd rows of devices; and means for applying, during the other field of a video frame, a reference potential to odd rows of devices and the input video signal to even rows of devices.

* * * * *